United States Patent
Leidolf et al.

(10) Patent No.: US 9,631,063 B2
(45) Date of Patent: Apr. 25, 2017

(54) COMPOSITION AND METHOD FOR MAKING A FLEXIBLE PACKAGING FILM

(71) Applicant: FRITO-LAY NORTH AMERICA, INC., Plano, TX (US)

(72) Inventors: Ashley Leidolf, Dallas, TX (US); Brad Dewayne Rodgers, Frisco, TX (US); Benjamin Soucy, Plano, TX (US)

(73) Assignee: Frito-Lay North America, Inc., Plano, TX (US)

(*) Notice: Subject to any disclaimer, the term of this patent is extended or adjusted under 35 U.S.C. 154(b) by 18 days.

(21) Appl. No.: 13/828,259

(22) Filed: Mar. 14, 2013

(65) Prior Publication Data
US 2014/0272304 A1 Sep. 18, 2014

(51) Int. Cl.
*C08K 3/26* (2006.01)
*C08K 3/00* (2006.01)
(Continued)

(52) U.S. Cl.
CPC .............. *C08K 3/26* (2013.01); *B29C 55/06* (2013.01); *B32B 7/00* (2013.01); *B32B 19/00* (2013.01); *B32B 19/04* (2013.01); *B32B 27/30* (2013.01); *B32B 27/302* (2013.01); *B32B 27/306* (2013.01); *B32B 27/32* (2013.01); *B32B 27/34* (2013.01); *C08J 5/18* (2013.01); *C08K 3/0033* (2013.01); *B29K 2023/065* (2013.01); *B29K 2105/06* (2013.01); *B32B 2264/10* (2013.01); *B32B 2264/102* (2013.01); *B32B 2264/104* (2013.01); *B32B 2439/70* (2013.01); *C08J 2323/04* (2013.01); *C08K 2003/265* (2013.01);
(Continued)

(58) Field of Classification Search
CPC .... C08K 3/26; C08K 3/033; C08K 2003/265; C08J 5/18; C08J 5/2323; Y10T 428/24479; Y10T 428/24992; Y10T 428/31746; Y10T 428/31913; B29K 2023/065; B29K 2105/06; B29C 55/06; B32B 7/00; B32B 19/00; B32B 19/04; B32B 27/30; B32B 27/302; B32B 27/306; B32B 27/32; B32B 27/34; B32B 2264/10; B32B 2264/102; B32B 2264/104; B32B 2439/70

See application file for complete search history.

(56) References Cited

U.S. PATENT DOCUMENTS 4,138,453 A * 2/1979 Segl, Jr. ................. 264/455
4,472,328 A 9/1984 Sugimoto
(Continued)

FOREIGN PATENT DOCUMENTS

| JP | 49116146 | * 11/1974 |
| WO | 2010/023606 A1 | 3/2010 |
| WO | 2012/112259 A2 | 8/2012 |

OTHER PUBLICATIONS

International Search Report and Written Opinion, International Application No. PCT/US2014/021966 dated Jun. 18, 2014 (8 pages).

*Primary Examiner* — Kevin R Kruer
(74) *Attorney, Agent, or Firm* — James R. Gourley; Colin P. Cahoon; Carstens & Cahoon, LLP

(57) ABSTRACT

Composition and method for making a flexible packaging film having highly loaded with at least one inorganic filler. A blown HDPE film comprising at least 50% by weight inorganic filler is oriented in the machine direction to increase yield and tensile strength, and reduce gauge variation to improve print qualities.

4 Claims, 2 Drawing Sheets

(51) Int. Cl.

| | | |
|---|---|---|
| *C08J 5/18* | (2006.01) | |
| *B29K 23/00* | (2006.01) | |
| *B29K 105/00* | (2006.01) | |
| *B29C 55/06* | (2006.01) | |
| *B32B 7/00* | (2006.01) | |
| *B32B 19/00* | (2006.01) | |
| *B32B 19/04* | (2006.01) | |
| *B32B 27/30* | (2006.01) | |
| *B32B 27/32* | (2006.01) | |
| *B32B 27/34* | (2006.01) | |
| *B29K 105/06* | (2006.01) | |

(52) U.S. Cl.
CPC .............. *Y10T 428/24479* (2015.01); *Y10T 428/24992* (2015.01); *Y10T 428/31746* (2015.04); *Y10T 428/31913* (2015.04)

(56) References Cited

U.S. PATENT DOCUMENTS

| | | | |
|---|---|---|---|
| 5,340,646 A | 8/1994 | Morita | |
| 5,827,905 A | 10/1998 | Grigat | |
| 5,902,869 A * | 5/1999 | Chou | 526/272 |
| 6,083,443 A * | 7/2000 | Eckart | B29C 55/023 264/173.12 |
| 6,573,340 B1 | 6/2003 | Khemani | |
| 7,052,641 B2 * | 5/2006 | Gennesson | B29C 55/065 264/288.4 |
| 7,658,875 B2 * | 2/2010 | Cooper | C08F 10/06 264/210.1 |
| 7,740,469 B2 * | 6/2010 | Cancio | B29C 55/06 264/173.16 |
| 8,440,125 B2 * | 5/2013 | Breese | B29C 55/06 264/175 |
| 2001/0041487 A1 | 11/2001 | Brady | |
| 2004/0034121 A1 | 2/2004 | Nozaki | |
| 2004/0077248 A1 * | 4/2004 | Kurahashi et al. | 442/401 |
| 2005/0069719 A1 * | 3/2005 | Blemberg et al. | 428/474.4 |
| 2005/0203208 A1 | 9/2005 | Ruiz | |
| 2008/0315447 A1 * | 12/2008 | Miller et al. | 264/48 |
| 2009/0047525 A1 | 2/2009 | Tilton | |
| 2010/0279046 A1 * | 11/2010 | Ashman | 428/36.91 |
| 2011/0171449 A1 * | 7/2011 | Lehrter et al. | 428/220 |

* cited by examiner

US 9,631,063 B2

COMPOSITION AND METHOD FOR MAKING A FLEXIBLE PACKAGING FILM

BACKGROUND OF THE INVENTION

Technical Field

The present invention relates to an oriented flexible film material that can be used in products and to a method of making the oriented flexible film.

Description of Related Art

Multi-layered film structures are often used in flexible packages where there is a need for advantageous barrier, sealant, and graphics-capability properties. Barrier properties in one or more layers are important in order to protect the product inside the package from light, oxygen or moisture. Such a need exists, for example, for the protection of foodstuffs, which may run the risk of flavor loss, staling, or spoilage if insufficient barrier properties are present to prevent transmission of such things as light, oxygen, or moisture into the package. The sealant properties are important in order to enable the flexible package to form an airtight or hermetic seal. Without a hermetic seal, any barrier properties provided by the film are ineffective against oxygen, moisture, or aroma transmission between the product in the package and the outside. A graphics capability is needed because it enables a consumer to quickly identify the product that he or she is seeking to purchase, allows food product manufacturers a way to label the nutritional content of the packaged food, and enables pricing information, such as bar codes, to be placed on the product.

One prior art method of producing polymer films is the blown film extrusion process. Blown film is created by extruding molten polymer resin through an annular die. Gas is blown onto the polymer film ring to stretch it and create a bubble with expanded diameter. The bubble is then collapsed into a two-layer sheet by rollers, optionally slit, and wound onto a storage roller.

There are several disadvantages to using blown film in subsequent printing and packaging operations. Blown film suffers from imperfections in the rolling and winding processes, such as wrinkles and fold-overs, which make its use in printing and packaging uneconomical. Graphics printing processes require smooth, uniform surfaces to produce attractive and functional films. Blown film is also typically very thick as compared to films produced by other processes. Therefore, yield, which can be expressed in square inches per pound of polymer, is very low in blown film. Additionally, blown film can have low tensile strength as compared to other films.

SUMMARY OF THE INVENTION

In one embodiment of the invention, a method of making a flexible packaging film comprises providing a blown film comprising high density polyethylene resin, at least 50% by weight inorganic filler, and an initial thickness; and orienting said blown film in a machine direction to produce an oriented film having a final thickness which is at least 35% less than said initial thickness. In one embodiment, the orienting step produces the oriented film having a thickness coefficient of variation of 10% or less. In another embodiment, the inorganic filler comprises at least one of talc, clays, silicon dioxide, diatamaceous earth, Kaolin, micas, gypsum, potassium nitrate, sodium chloride, metal chlorides, dolomite, bentonite, montmorillonite, metal sulfates, ammonium nitrate, sodium nitrate, titanium dioxides, and calcium carbonate.

In one embodiment, the orienting step comprises a draw ratio of between 1.1:1 and 3.0:1. In another embodiment, the method further comprises the step of laminating said oriented film with one or more skin layers, which can comprise at least one of EAA (ethylene acrylic acid), EVOH (ethylene vinyl alcohol), Nylon, HDPE (high density polyethylene), LDPE (low density polyethylene), LLDPE (linear low density polyethylene), PGA (polyglycolic acid), or PBS (polybutyl styrene).

In one embodiment of the invention, a flexible packaging film comprises a blown film comprising high density polyethylene resin and at least 50% by weight inorganic filler, wherein said blown film has been oriented in a machine direction to a final thickness which is at least 35% less than an initial thickness. In another embodiment, the blown film comprises a thickness coefficient of variation of 10% or less.

The inorganic filler may comprise at least one of talc, clays, silicon dioxide, diatamaceous earth, Kaolin, micas, gypsum, potassium nitrate, sodium chloride, metal chlorides, dolomite, bentonite, montmorillonite, metal sulfates, ammonium nitrate, sodium nitrate, titanium dioxides, and calcium carbonate.

In another embodiment, the film further comprises at least one skin layer on said blown film, which can comprise at least one of EAA (ethylene acrylic acid), EVOH (ethylene vinyl alcohol), Nylon, HDPE (high density polyethylene), LDPE (low density polyethylene), LLDPE (linear low density polyethylene), PGA (polyglycolic acid), or PBS (polybutyl styrene).

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

DETAILED DESCRIPTION

Figure 1:
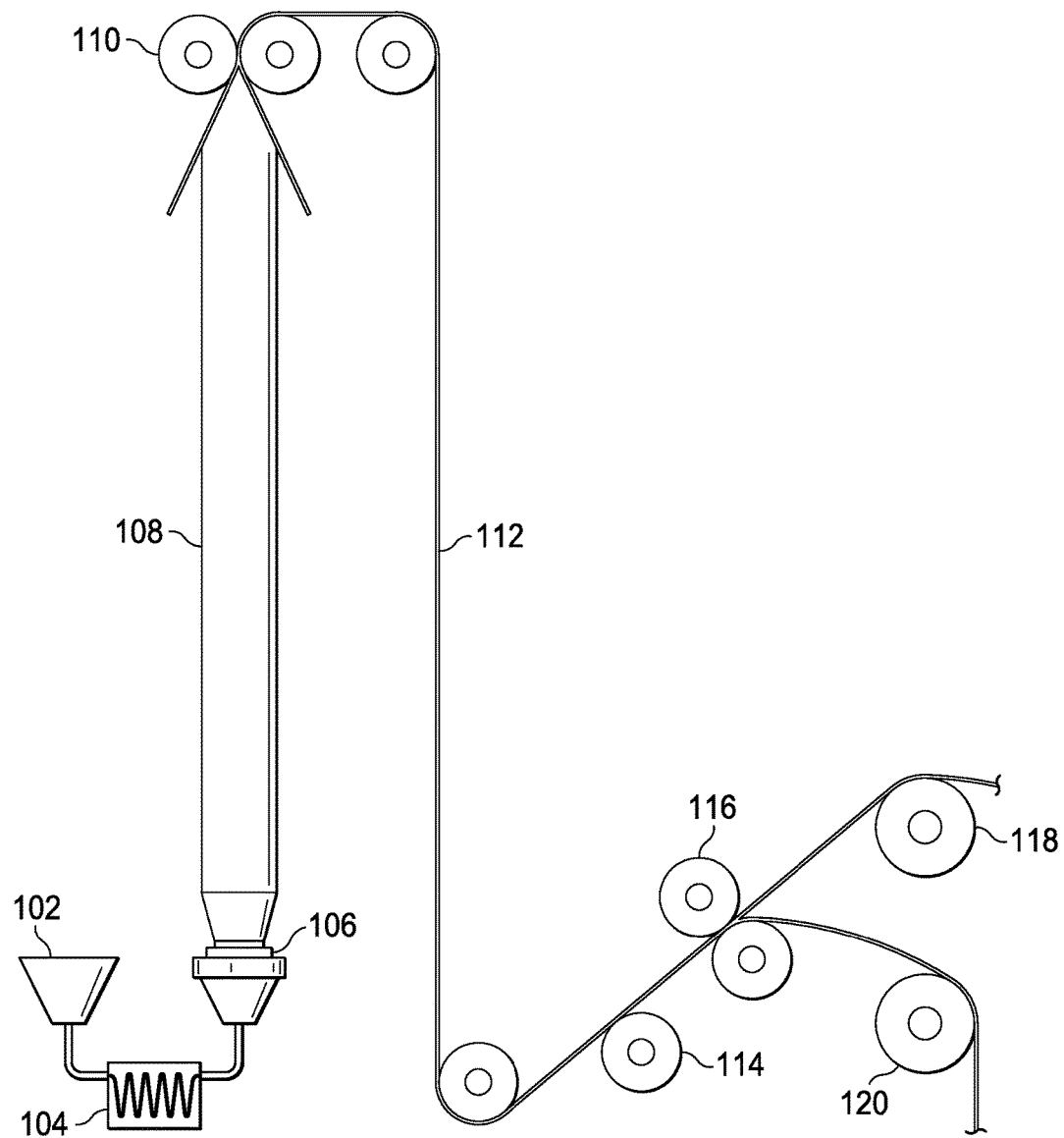
FIG. 1 depicts one embodiment of a system for producing blown film.

In one embodiment, the present invention is directed towards an oriented blown film for use in a multi-layer flexible film package. FIG. 1 depicts one embodiment of a system, sometimes referred to as a high stalk blown film line, used to produce the blown film of the present invention. Polymer resins, additives and other ingredients are combined in a hopper 102 and fed into an extruder 104. Inside the extruder, the ingredients are melted and mixed, and extruded through an annular die 106 (or ring die) as gas is blown onto the polymer film tube 108 exiting the die. The gas helps stretch and expand the diameter of the polymer tube 108. The polymer tube 108 is compressed and flattened between rollers 110 to produce a two-layered sheet 112. This two-layered sheet 112 can then be wound onto a storage roller, or proceed to a slitting operation 114. The sheet 112 can be slit on one side and unfolded into a single-layered sheet approximately twice as wide as the two-layered sheet. Alternatively (as shown in FIG. 1), the sheet 112 can be slit on both sides, separated 116 into two single-layered sheets which each comprise a width approximately equal to the width of the two-layered sheet, and wound onto storage rollers 118 and 120.

One of the main cost drivers in the production of blown films is the cost of the raw materials input into the extruder. For example, high density polyethylene (HDPE) resin can be prohibitively expensive for use in packaging films intended for low-cost products. Applicants herein propose to reduce the cost of the raw materials by substituting a high amount of inorganic filler into the starting ingredient mixture. The inorganic filler displaces a significant portion of the polymer resin needed to create a blown film.

Non-limiting examples of inorganic fillers include, but are not limited to talc, clays, silicon dioxide, diatamaceous earth, Kaolin, micas, gypsum, potassium nitrate, sodium chloride, metal chlorides, dolomite, bentonite, montmorillonite, metal sulfates, ammonium nitrate, sodium nitrate, titanium dioxides, and calcium carbonate.

Applicants have discovered that when inorganic fillers are included at levels above 50% by weight in an HDPE polymer resin mixture, the resulting blown film comprises properties that make its use as part of a product packaging film problematic in a commercial setting. First, the tensile modulus is greatly reduced at high loading levels, causing the film to wrinkle and fold over during the printing process. If additional tension is applied to the film to correct this issue, the film exhibits significant "neck-in" which reduces overall yield. Additionally, the surface of such a blown film is relatively rough as compared to films that do not include significant amounts of fillers. A smooth printing surface is ideal for printing consistent and vibrant graphics used for product packaging.

Figure 2:
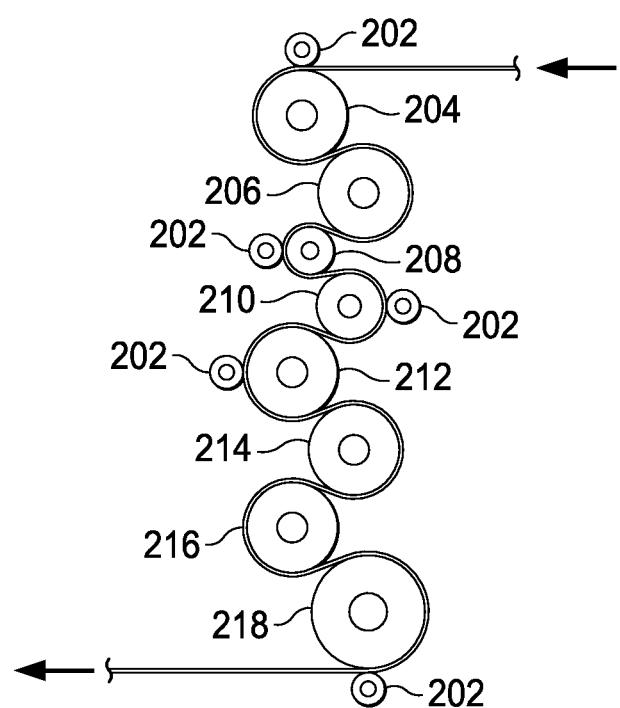
FIG. 2 depicts one embodiment of a system for orienting blown film in the machine direction.

These challenges can be overcome by passing a highly loaded HDPE blown film through a machine direction orientation process, one embodiment of which is depicted in FIG. 2. The film is first passed between nip roller 202 and first and second heating rollers 204 and 206. The film is then stretched between the slow draw roller 208 and fast draw roller 210. Annealing rollers 212 and 214, and cooling rollers 216 and 218 complete the orientation process.

Although the process shown in FIG. 2 depicts multiple rollers being used, in its broadest respect, the machine direction orientation can be accomplished by use of two or more independently driven rollers that stretch the film between one roller and the next. Preferably, one or more of the rollers is heated to a temperature just below the melting point of the polymer film being oriented. The draw ratio can vary from 1.1:1 to 3.0:1. The draw ratio is defined herein as the unoriented film thickness:oriented film thickness.

Blown films can be passed through the machine orientation process before or after the slitting step described above.

The orientation process improves the highly loaded film in several ways. First, it improves the tensile strength of the film. In a series of tests, blown HDPE films comprising about 50% by weight calcium carbonate filler were oriented in the machine direction by a process similar to the one described above with reference to FIG. 2. The results of these tests are described below.

In one test, a blown HDPE film having an average initial thickness of 1.5 mils prior to orientation comprised a tensile strength of 1164 grams of force. When the 1.5 mil film was oriented to a final thickness of 1.0 mils, the tensile strength improved to 1607 grams of force (a 38% increase). When a 1.5 mil film was oriented to a final thickness of 0.7 mils, the tensile strength improved to 1665 grams of force (a 43% increase).

In another test, a blown HDPE film having an average initial thickness of 2.0 mils prior to orientation comprised a tensile strength of 1788 grams of force. When the 2.0 mil film was oriented to 1.0 mil final thickness, the tensile strength increased to 2016 grams of force (a 13% increase). Similarly, when a 2.0 mil film was oriented to a 0.8 mil final thickness, the tensile strength increased to 2180 grams of force (a 22% increase). The tensile strength of each film was measured using Instron 4444 tensile testing equipment. Mechanical force is applied to a 1 inch by 4 inch film sample, and the elongation and force required to break the sample are measured.

The improvements in tensile strength are not the only advantages to passing the blown film through the machine orientation process described above. The table below shows the yield in thousand square inches per pound (Msi/lb) for each of several blown films made using HDPE resin loaded with about 50% by weight calcium carbonate. The Base Film column represents the blown film that has not undergone the machine direction orientation process. The MDO Film is film that has been oriented to a final average thickness of 0.8 mils.

TABLE 1

Yield Increase by Machine Direction Orientation

| Base Film Thickness (mil) | Base Film Yield (Msi/lb) | MDO Film Yield (Msi/lb) | Yield Increase (Msi/lb) | Percent Yield Increase | Percent Gauge Decrease |
|---|---|---|---|---|---|
| 1.25 | 34 | 48 | 14 | 41% | 36% |
| 1.5 | 27 | 52 | 25 | 93% | 47% |
| 1.75 | 22 | 39 | 17 | 77% | 54% |
| 2.0 | 19 | 37 | 18 | 95% | 60% |

As the data in Table 1 show, orienting highly loaded blown film can vastly increase the yield, and therefore the number of packages that can be made using a sheet of blown film. Thus, film thickness can be decreased by at least about 35%, and the overall yield can be increased by more than 40%.

Yet another advantage provided by the machine direction orientation step is that the gauge variation or surface roughness is decreased in the MDO film. Cross sections of samples of highly loaded blown HDPE films were analyzed by scanning electron microscope before and after the machine direction orientation process. Both the top and bottom surface of the MDO film showed significant reductions in gauge variation and a smoother surface. A smooth surface is important in high definition printing processes.

In one example, the gauge variation was measured on a base film having a 1.5 mil nominal thickness and an MDO film having a 0.5 mil nominal thickness. The MDO film showed improvements in standard deviation over the average thickness (or thickness coefficient of variation), and minimum and maximum thicknesses over the average thickness. In one embodiment, an MDO film of the present invention comprises a thickness coefficient of variation (standard deviation divided by average thickness) of 10% or less.

The flexible film of the present invention can be laminated onto one or more further layers of packaging film according to methods known in the art. For example, one or more core layers comprising an MDO film described herein can be laminated with one or more skin layers, which can be used to promote metal adhesion, sealing, or other surface properties. Examples of skin layers include EAA (ethylene acrylic acid), EVOH (ethylene vinyl alcohol), Nylon, HDPE (high density polyethylene), LDPE (low density polyethylene), LLDPE (linear low density polyethylene), PGA (polyglycolic acid), or PBS (polybutyl styrene). The total thickness of a multilayered packaging film according to one embodiment of the present invention can range from 0.5 mils to 3.0 mils. Packaging film can then be used to create flexible product package using equipment, such as a vertical form fill seal (VFFS) machine, which are commercially available in the art.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

While this invention has been particularly shown and described with reference to a preferred embodiment, it will be understood by those skilled in the art that various changes in form and detail may be made therein without departing from the spirit and scope of the invention.

What is claimed is:

1. A method of making a flexible packaging film comprising:
   providing a blown film comprising high density polyethylene resin, at least one skin layer on said blown film, wherein said skin layer comprises EAA (ethylene acrylic acid), wherein the blown film comprises at least 50% by weight inorganic filler, and an initial thickness;
   compressing said blown film between rollers; and
   orienting said blown film in a machine direction by passing the blown film between a set of heating rollers and stretching the blown film between the slow draw roller and a fast draw roller to produce an oriented film having a final thickness which is at least 35% less than said initial thickness.

2. The method of claim 1 wherein said inorganic filler comprises at least one of talc, clays, silicon dioxide, diatamaceous earth, Kaolin, micas, gypsum, potassium nitrate, sodium chloride, metal chlorides, dolomite, bentonite, montmorillonite, metal sulfates, ammonium nitrate, sodium nitrate, titanium dioxides, and calcium carbonate.

3. The method of claim 1 wherein said orienting step comprises a draw ratio of between 1.1:1 and 3.0:1.

4. The method of claim 1, wherein said orienting further comprises:
   passing the blown film between a set of annealing rollers; and
   passing the blown film between a set of cooling rollers.

* * * * *